May 13, 1969 H. W. F. DOMNICK 3,443,501

PHOTOGRAPHIC CAMERA AND FILM MAGAZINE THEREFOR

Filed June 15, 1966

HANS DOMNICK, INVENTOR

INVENTOR
HANS DOMNICK

FIG.13

May 13, 1969  H. W. F. DOMNICK  3,443,501
PHOTOGRAPHIC CAMERA AND FILM MAGAZINE THEREFOR
Filed June 15, 1966  Sheet 7 of 10

INVENTOR
HANS DOMNICK

3,443,501
PHOTOGRAPHIC CAMERA AND FILM
MAGAZINE THEREFOR
Hans Wolfgang F. Domnick, Bismarckstrasse 69,
Berlin 39, Germany
Filed June 15, 1966, Ser. No. 557,817
Claims priority, application Germany, Mar. 9, 1966,
D 49,553
Int. Cl. G03b 19/04
U.S. Cl. 95—31      3 Claims

ABSTRACT OF THE DISCLOSURE

A film magazine and camera that includes a film magazine in two parts, one of which holds a film magazine reel, and the other of which holds a film take-up spool. When the magazine parts are separated the film is unwound from the film supply reel and the film take-up spool is blocked during this interval. When the magazine parts are joined together, the portion of film that was unwound from the film supply reel is wound onto the take-up spool.

---

The invention concerns a film magazine consisting of two magazine chambers, the first of which serves as a holder for a film supply spool and the second as a holder for a film take-up spool, and a design for a camera suitable for utilizing the invented film magazine.

Film magazines have been known for years to the photo industry. People like to use film magazines especially if they intend to alternate between using color and black-and-white films in a camera without having used up all the pictures available on the entire length of the film. If the films have been packaged in magazines or so-called changing magazines, then the magazines can be exchanged at any time after completion of any number of exposures.

There are magazines which have lightproof cover plates which are inserted into the magazine before it is replaced by another in order to protect the film in the magazine against light. Furthermore, there are magazines whose film-supply and take-up spools are linked together with a fixed crosspiece or a spacing strip. The primary disadvantage of these magazines is the fact that between the two spools there is an exposure-protected strip of film which is exposed during a change of magazines. Thus, film material is lost during each change of magazines and there is a danger that parts of the film strips on the film-supply and take-up spools are spoiled through exposure to light.

This invention is based on the problem of developing a film magazine of the above-mentioned type, which forms a universally covered, lightproof unit, of placing it as such into a camera and of removing it from the camera after complete or partial exposure of the film. This is to be done without film losses caused by objectionable exposure during the exchange of magazines. Furthermore, a camera model is provided which is suitable for utilizing a magazine of the above-mentioned type.

According to this invention, this is achieved by designing the magazine parts as chambers open on one side, which can be joined into a lightproof unit covered all around and a dividing magazine, which comprises both spools. The magazine, which includes both spools, has the advantage that it can be inserted into any camera without use of the light-screening cover plate and that it can be removed from the camera at any time. Moreover, the exposed film strip can be cut off from the unexposed film strip and the remainder of the unexposed film can be used for additional photographs.

A further advantage of the magazine of the present invention, as compared to the so-called changing magazines, is the fact that there is no more loading of a film into the magazine or of the camera, since the film magazine of the present invention can be loaded into the camera as a lightproof unit.

To keep the dimensions of the film magazine of the present invention as small as possible, the selected distance of the longitudinal axis centers of the spools in the chamber is about equal to the sum of the two radii of the spools and to the total dimensions of the film turns on one or both spools; and the film-supply spool and the film take-up spool are arranged side by side on the same level in the magazine.

Lightproof locking of the film magazine of the present invention can be achieved by the fact that the walls of the magazine chambers partially overlap in the interlocked condition and that in the sphere of the overlapping walls a locking device against an automatic shift, one against the other, of the two magazine chambers is provided.

For example, if the locking device is designed with at least one notch provided on the inner surface of the wall which will be on the outside of the one magazine chamber, which notch is to be made to interlock with a projection provided for one of the outside surfaces of the wall which will be on the inside of the other magazine chamber, then there will be two slightly flexible but well closing and tightly fitting magazine chambers.

The film-supply spool and the film take-up spool should be appropriately arranged to be freely revolving in the magazine chambers. If one end of the spool of the film take-up spool passes through the part of the wall designed as the base plate of the magazine chamber holding this spool and if the spool of the film take-up spool is designed as a hollow spool and if it has at its interior wall at one of its ends a multitude of tooth-like projections running in the direction of its longitudinal axis, arranged along its circumference, then it will be possible to turn the film take-up spool from the outside. If the spool is designed so that both its ends have the aforementioned tooth-like projections, then the magazine of the present invention equipped with this spool can, for example, also be used in a two-film camera, since turning of the spool can be accomplished without difficulty. If one end of the film take-up spool passes through the base plate of the magazine chamber, then the base plate of the other magazine chamber must have a recess whose width corresponds approximately to the diameter of the spool of the film take-up spool. To ensure that the two joined magazine chambers constitute a light-proof unit, it is necessary that the base plates of the two magazine chambers also overlap in the area of the aforementioned recess.

To be able to insert the film magazine of the present invention into a camera, preferably sliding bars must be arranged at the base and cover plates of the magazine chambers, which run parallel to one another and to the free edges of the magazine chambers.

Since it is desirable to prevent automatic unwinding of the film from the spools, a brake device has been provided in at least one of the magazine chambers designed appropriately as a flat spring with two free ends, which is arranged on the interior wall of the magazine chamber having the film-supply spool, in such a manner that one free end rests on the film-supply spool and the other free end rests flexibly on the film take-up spool.

In a camera suitable for the loading with the film magazine of the present invention, a space must be provided for placing the film magazine. This space must be chosen big enough so that at least the area must be completely outside the optical path of rays of the camera, which is taken up by the magazine chamber which includes the film-supply spool.

As with any other camera, the space allotted for insertion of the magazine must be made lightproof by a shutter component for this camera. It would be preferable if this shutter component would be fastened with a swivel arrangement to this camera by means of a hinge and if in the area of the hinge it had an extension piece which is fixed to the shutter component and which, when the shutter is open, reaches into the interior of the camera so that it adjoins the side wall of the magazine chamber bearing the film take-up spool when the magazine is inserted into the camera and prevents an automatic loosening of both magazine chambers from one another if the camera is open. This constitutes a safeguard that, when the camera is open, no undesirable light will enter the interior of the magazine. It is appropriate that the shutter component have a projection on the side turned toward the camera which is suitable during the swing back of the shutter component in closing direction, to shift the magazine chamber, which has the film take-up spool toward the other magazine chamber, in such a manner that a loosening of the interlocking of both magazine chambers takes place; however, a lightproof connection of the magazine chambers continues.

By selecting the proper length of this projection, a locking device on the film magazine can be released; however, a complete separation of the two magazine components cannot yet take place because of the overlapping walls, as long as the camera shutter does not completely fit into the housing.

Insertion and removal of the film magazine of the present invention in or from the camera housing can be facilitated if sliding rails are provided for inside the housing which can take on sliding bars arranged along the magazine chambers. In this connection, it is required that the sliding rails, serving the insertion of the sliding bars of the magazine chamber with the film take-up spool, are arranged flexibly within the camera housing, since this magazine chamber must be arranged flexibly to the other magazine chamber within the camera to be able to bring film strips which are in the film magazine to a position in the camera housing suitable for the taking of a picture.

Appropriately the upper sliding rails are arranged flexibly below, so that they automatically rise when the magazine is inserted and thus facilitate the insertion of the magazines.

Once the film magazine of the present invention is inserted into the camera housing, then the magazine chamber bearing the film-supply spool will be fastened inside the camera, for example, by means of the sliding rails described above. On the other hand, the other magazine chamber is adjustable as indicated. For that purpose a sled-type device can be provided which is to interlock with the magazine chamber carrying the film take-up spool and which is suitable for moving this magazine chamber perpendicular to the longitudinal axis of the film take-up spool, relative to the other magazine chamber, through the area of the optical path of rays of the camera and out of the latter far enough that it will be completely outside of the area of the optical path of rays. It is appropriate to run this sled-type device with the aid of one or several sliding rails fastened to the inside of the camera housing. The activation of the sled-type device can be accomplished by means of a draw gear, which may be linked to the shutter cocking device, which is present in every camera in such a manner that the shutter between lenses is cocked when the draw gear is activated.

To return the sled-type device and thus the magazine chamber to its original position, preferably a resetting device is provided, which, after the photograph is taken, coupled with the release of the between-lens shutter, automatically resets itself. Thus, the two magazine chambers are at all times rejoined within the closed camera, so that no light can penetrate the film magazine when the camera shutter is opened.

To insure that during the taking of pictures the film strip which is on the film-supply spool is rolled into the take-up spool, an appropriate driving mechanism is planned which is appropriate for locking the film take-up spool against turning when the sled-type device returns to its initial position. Thus, the film take-up spool, which moves away from the film supply spool during the cocking procedure of the camera, will pull along the film from the film-supply spool. The film strip connecting the two spools thus lies within the area of the optical path of rays of the camera and can be exposed by release of the shutter. When the sled-type device is returned to its initial position, the film take-up spool also comes closer to the film-supply spool. The above-mentioned operating device insures that the film strip is being completely spooled up on the film take-up spool, until the two magazine chambers are rejoined. If the lock of the camera is opened after the photograph is taken, and the magazine is removed, then one knows that all completed exposures are spooled up on the take-up spool, so that if the pictures are supposed to be developed before the entire film strip has been exposed, one can be certain that no pictures will be lost when the film strip is cut between the two spools.

Further details of this invention can be seen from the following description with the aid of the diagrams.

In the following, the same reference symbols refer to the same reference parts.

Figure 1:
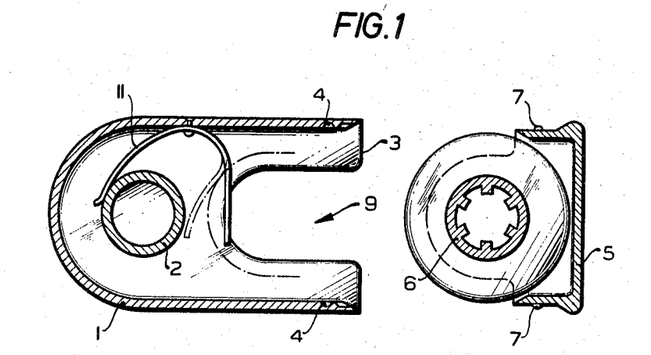
FIG. 1 shows a cross section of the two separated magazine chambers, according to the invention.
Figure 2:
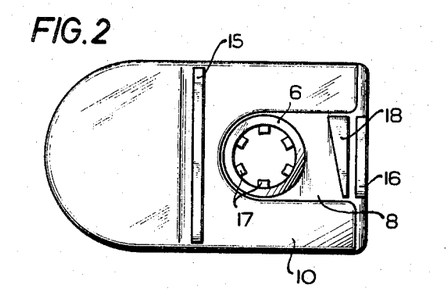
FIG. 2 shows a top view of the magazine chambers of FIG. 1, joined into the magazine.
Figure 3:
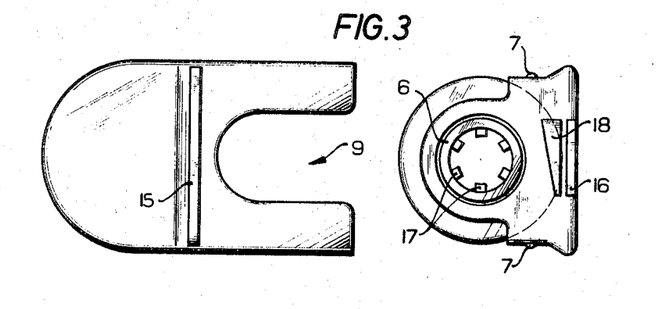
FIG. 3 shows a top view of the separate magazine chambers, shown in FIG. 1.
Figure 4:
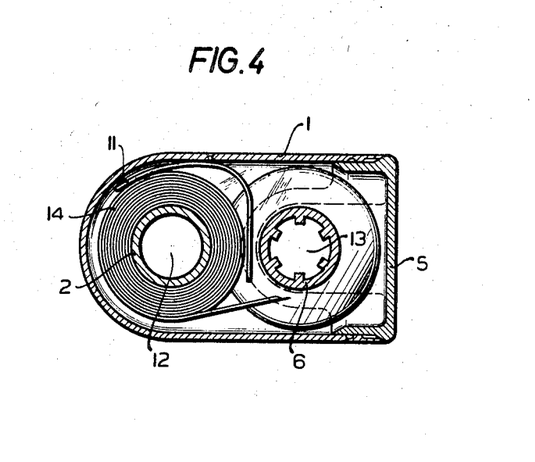
FIG. 4 shows a cross section of the closed magazine, according to the invention, which is lightproof and which has been loaded.

FIG. 1 shows a magazine chamber 1 in the form of a U-shaped chamber open to one side, which is suitable for insertion and holding in place of a film-supply spool 2. One the inner surface of the wall of the magazine chamber 1, a notch 4 is provided at a distance from edge 3 running parallel to the side edge. The wall of the magazine chamber 1 in the area of edge 3 is beveled to the inside. A second magazine half 5, also shown in a sectional view, holds a film take-up spool 6 in place. The magazine half 5 is also designed as a U-shaped chamber, whose outside measurements correspond to the inside measurements of the magazine chamber 1. On the outside surface of the side wall of magazine chamber 5, click stop studs 7 are arranged which mesh with the concave cone 4 when the magazine chambers are telescoped and cause interlocking of the two magazine chambers against one another. Since, as can be seen from FIG. 2, the spool of the film take-up spool 6 protrudes through the covers 8 and 8a of magazine chamber 5 (FIG. 5), a recess 9 is provided in magazine chamber 1, whose width is about equal to the diameter of spool 6. The dimensions of the cover area of magazine chamber 5 have been so chosen that sections of cover areas 10 of magazine chamber 1 and of cover areas 8 of magazine chamber 5, with magazine chambers 1 and 5 telescoped, overlap so much that they guarantee against entry of light into the interior of the magazine. On the interior wall of magazine chamber 1, a flat spring 11 has been provided, which with one end adjoins the circumference of spool 2 and with its interposed magazine chamber 5 adjoins the other end at the circumference of spool 6. The effect of this flat spring is that a film strip 14 on a spool 2 cannot automatically roll itself and that the film turns, rolled up on spool 6, can also be kept in this position. The dimensions of the two magazine chambers 1 and 5 are determined by the distance of the longitudinal axis centers 12 and 13 of spool 2 or 6. In the illustrated example, this distance corresponds to the sum of the radii of the two spools 2 and 6, plus the strength of the film strip on spool 2 and the strength of the film strip rolled up on spool 6. The two spools 2 and 6, thus, are placed side by side as close together as possible. As can be seen from FIGS. 2 and 5, base and cover plates, 10, 10a or 8, 8a, sliding bars 15, 15a, 16 and 16a, running parallel to the edges of containers, are provided for the cover and bottom surfaces.

Figure 5:
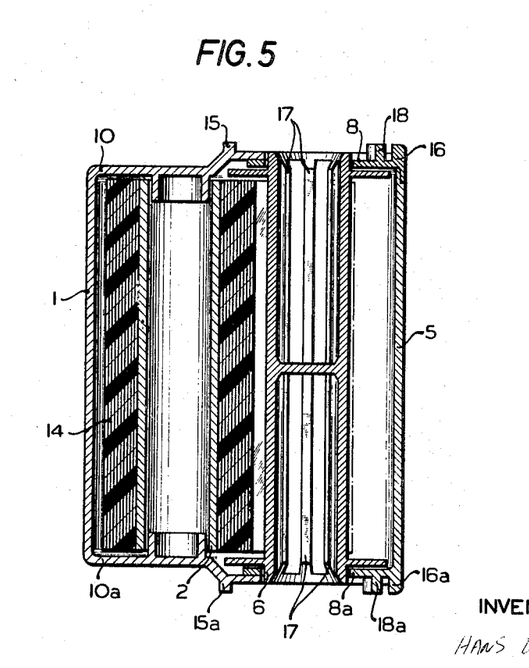
FIG. 5 shows a longitudinal view of the magazine shown in FIG. 4.
Figures 6, 7:
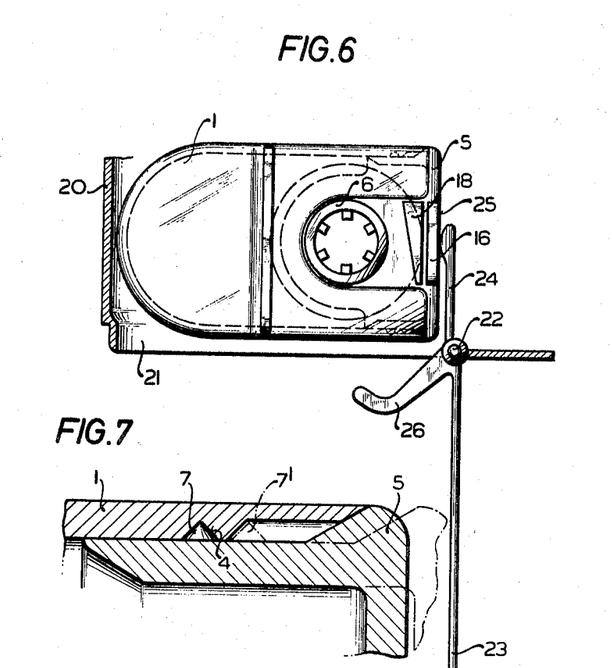
FIG. 6 shows the magazine of the present invention according to FIG. 2, inserted into a magazine which is only partially shown.
FIG. 7 shows a longitudinal section through the telescoped wall components of the two magazine halves.

As can best be seen from FIG. 5, spool 6 of the fill take-up spool has been provided as a hollow cylinder, which has a series of teeth 17 covering the spool in a longitudinal direction along the inside wall. These series of teeth have the purpose of making possible an intervention in the spool from outside the magazine, in order to attain a turn of the spool within the magazine. Magazine chamber 5 has a wedge-shaped protrusion 18 and 18a on its cover and bottom surfaces 8 and 8a. This protrusion 18 and 18a serves to engage a lifting mechanism, to be later described, which is used to bring the two closer together. The above-mentioned lever mechanism is shown in FIG. 6. The magazine 1, 5 is placed into the housing of a camera 20 through an opening 21 in the back of the camera. A shutter component 23 swiveling around joint 22, which must be locked lightproof with camera wall 20, closes opening 21 (see FIG. 8). The shutter component 23 has an extension piece 24 which is rigidly connected with the shutter component and reaches into the interior of the camera housing 20. When the shutter component 23 is open, the extension piece 24 rests tightly against side wall 25 of magazine chamber 5 and keeps the two magazine chambers 1 and 5 interlocked. In the angle to the shutter component 23, starting from joint 22, there extends lever-shaped projection 26, whose free end is hook-shaped. Projection 26 runs in an acute angle to shutter component 23 and is suitable for resting against projection 18 during the locking process and for sliding along its wedge-shaped lateral face which becomes wider toward the top. Thus, pressure is exerted on magazine chamber 5 and the click-stop protuberance 7 is forced out of the hollow cylinder 4 provided in the magazine chamber.

FIG. 7 is a sectional view in an extended position and shows the position of the two magazine chambers 1 and 5, when they are loaded into the camera. The shaded area indicates the position of magazine chamber 5 to magazine chamber 1, after the projection 26 has forced the click-stop protuberance 7 from the hollow cylinder 4. Also in this position, the two magazine parts are joined together in a lightproof manner, so that no light can penetrate into the magazine interior during the locking process.

Figure 8:
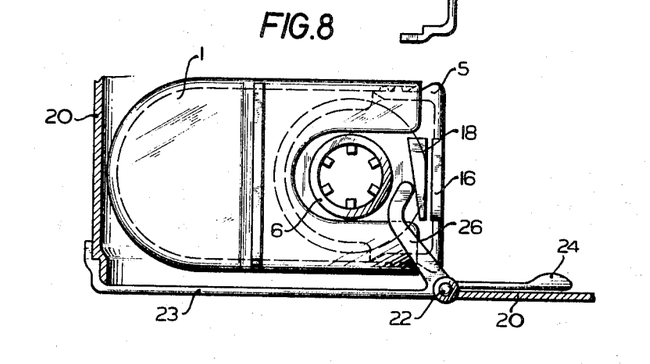
FIG. 8 shows the magazine shown in FIG. 6 in its position with closed camera back.

Once the locking process has been completed, then the shutter part 23 interlocks with camera wall 20. The extension piece 24 lies approximately parallel with the back of the camera, thus freeing the side wall 25 of the magazine chamber 5 and the projection 26 touches the wedge-shaped projection 18.

Figure 12:
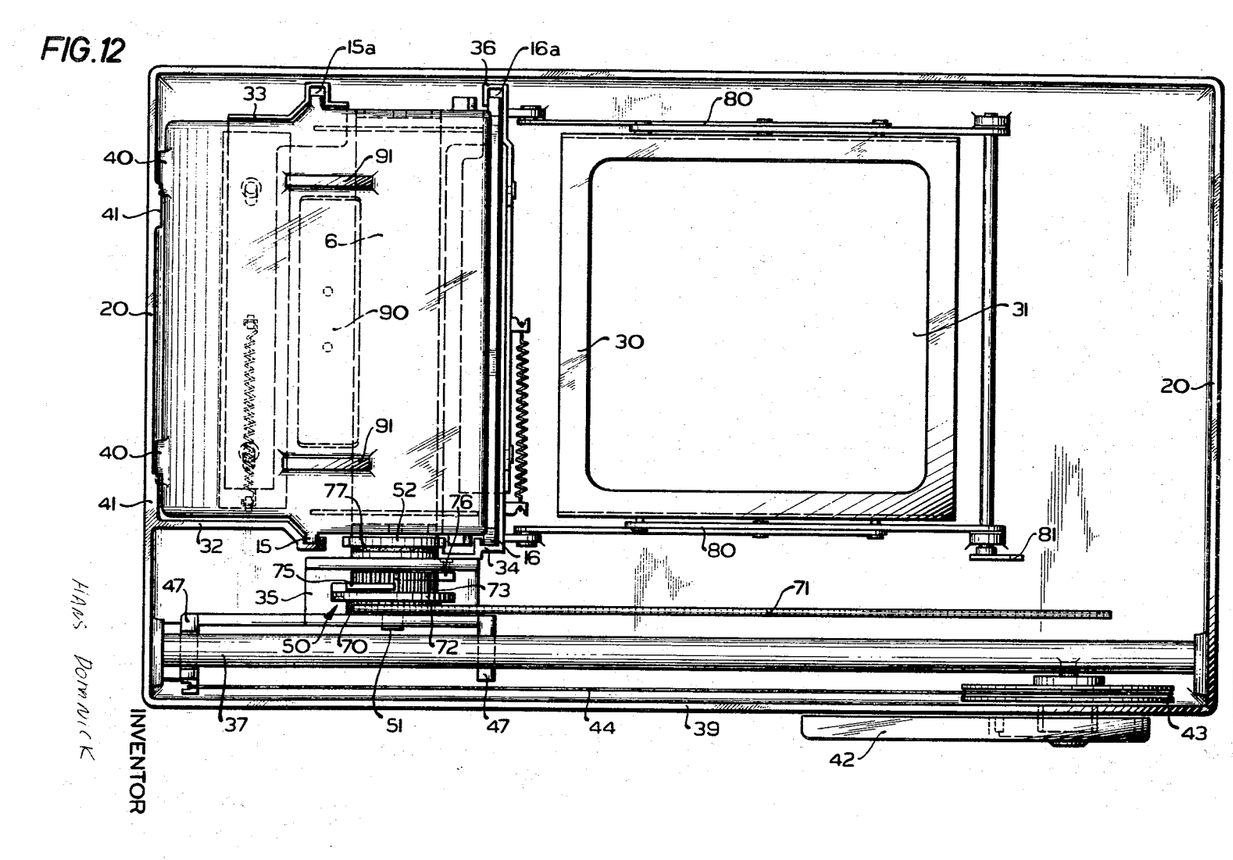
FIG. 12 shows the magazine of the present invention placed into the camera and the back of the camera has been removed.

In FIG. 12, the complete back of the camera has been removed, so that the position of magazine 1, 5, in relation to the camera housing 20, can be seen. Here the dimensions of the camera housing 20 have been so chosen, that magazine 1, 5 is located completely outside the area of the camera's optical path of rays when it is loaded into the camera housing. The area of the optical path of rays is defined here by a film pressure frame 30, which determines the projection window 31. The sliding bar 15 of magazine chamber 1 is embedded in a sliding rail 32, which is firmly connected to the camera housing 20. The sliding bar 15a of this magazine chamber runs in a flexibly fastened sliding rail 33, which is also firmly attached inside the camera housing. However, the sliding bar 16 of magazine chamber 5 rests on sliding rail 34, which is connected to a movable sled-like device 35. The sliding rail 36 is flexibly joined with a sliding rail 34, which flexibly accommodates the sliding bar 16a and is also movable together with the sled-like device. For a snug fit of the film magazine 1, 5 inside the camera housing, short projections 40 are provided at the side wall of the magazine chamber 1, which must be forced into engagement with counter-projections 41 in the camera housing 20 and guarantee a snug fit of the magazine, so that it cannot happen that magazine chamber 1 is shifted while magazine chamber 5 is moved. To facilitate loading and especially removal of film magazine 1, 5, two handles 91 have been attached to the exterior wall of the magazine. To guarantee a safe snug fit of the magazine in the magazine housing, a flat spring 90 has been provided at the camera housing, which is put under slight tension when the magazine is loaded into the camera housing and adapts itself to the magazine 1, 5. It is a further effect of the spring 90, that the short projections 40 of the magazine, when lifted with the aid of the handles 20, do not interlock with the housing projection 41 and thus provides pressure toward the outside for the easy removal of the magazine. The sled-like device 35 slides on rails 37, 38, which extend from one side wall of the camera housing to the other and are fastened to the housing wall. In the base area 39 of the camera housing 20, there is the shutter cocking lever 42, which must be operated from the outside by the photographer for film transport. With this shutter cocking lever 42 a rope drum 43, over which runs a drawstring 44 connected with the sled-like device 35, is connected in the interior of the camera housing by means of a gear train. When the shutter cocking lever 42 is operated, the rope drum 43 turns and spools up the drawstring 44 on its circumference, whereby the sled-like device 35 glides along the rails 37, 38 in the direction of the rope drum. The sled-like device is connected to the spool 6 of the film take-up spool through a coupling device 50. When their sliding carriage moves to the right in the figure, the two magazine chambers 1 and 5, whose locking device had already been loosened when the camera was closed, come apart and the magazine chamber 5 moves along to the right with the sliding carriage. In this operation, the film strip is pulled off the film-supply spool 2 and is pulled along by the locked film take-up spool 6.

Figure 14:
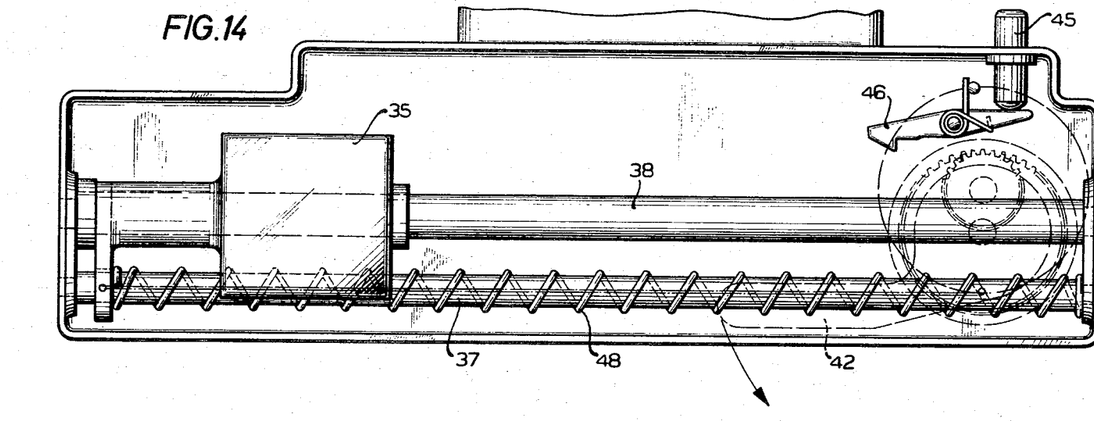
FIG. 14 shows a side view of the feeding mechanism in the camera for the magazine in a position before or after the taking of a photograph.
Figure 15:
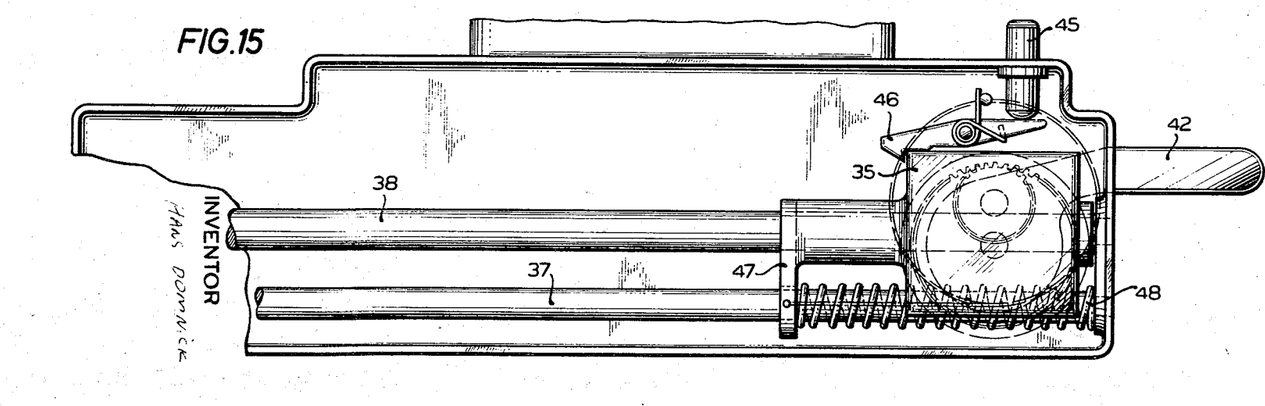
FIG. 15 illustrates the feeding mechanism shown in FIG. 14, in its position immediately preceding the taking of a picture.
Figure 16:
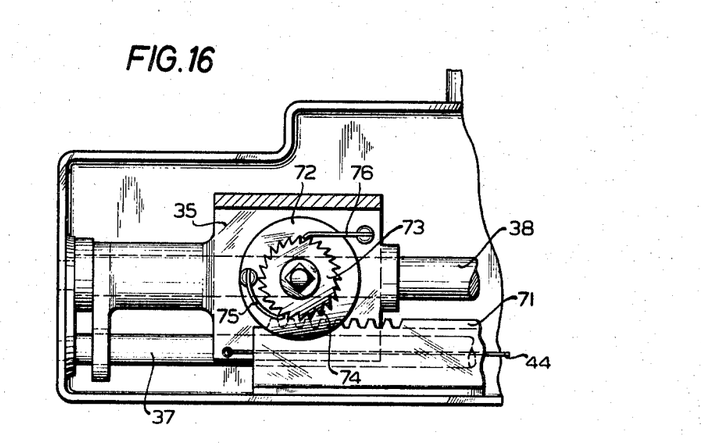
FIG. 16 shows a partial section of the locking mechanism of the feeding device connected with the film take-up spool.
Figure 17:
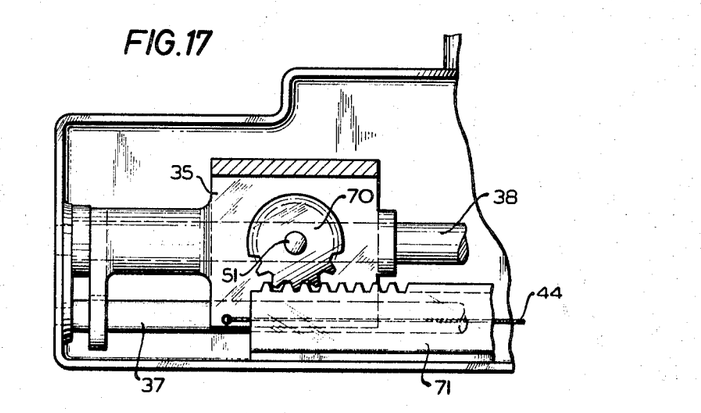
FIG. 17 shows a partial section of the gear wheel of the feeding device connected to the film take-up spool.
Figures 18, 19:
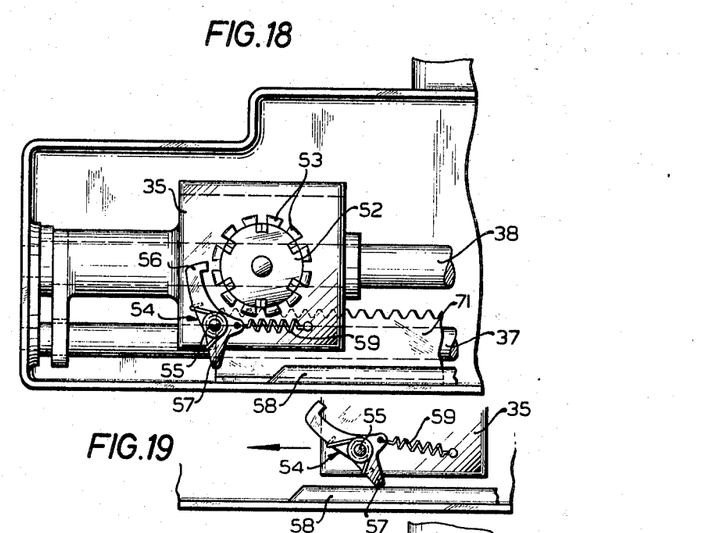
FIG. 18 shows a side view of the toothed disc meshed with the film take-up spool.
FIG. 19 illustrates the arresting device for the toothed disc shown in FIG. 18, in non-locking position.
Figure 20:
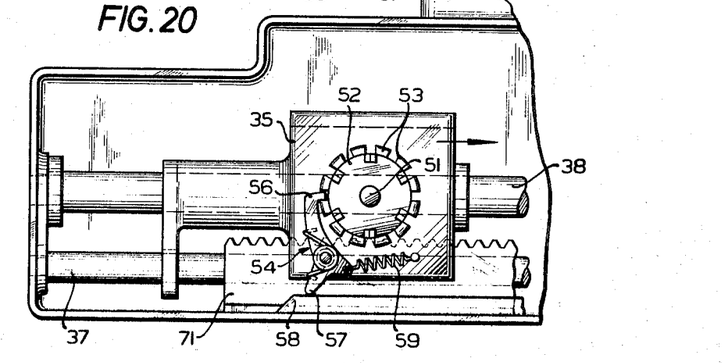
FIG. 20 shows the toothed disc shown in FIG. 18, engaged with the arresting device.

As can be seen from FIGS. 14 and 15, a button 45, to be operated from the outside, which is connected to a locking mechanism 46 is provided in the area of the rope drum 43. This locking mechanism has been designed as a two-armed lever, one of its ends has the purpose of locking the sled-like device 35, which is pulled to the right by the rope drum. This locking of the sled-like device is required since between the camera wall, which is located in the area of the rope drum, and one of the sliding jaws 47 of the sliding carriage 35, which glides along the sliding rails, there is a pressure spring 48 which comprises the sliding rail 37. This pressure spring is compressed when the sled-like device moves in the direction of the rope drum and thus exercises spring force on the sled-like device, against which the sled-like device 35 must be locked in its final position in the area of the rope drum, until the exposure process of the film has been completed. If the release button 45 is operated from the outside, then the locking lever 46 releases the sled-like device 35, and the latter is compressed to its initial position by means of the effect of the spring force of spring 48. In the initial position, the two magazine chambers 1 and 5 again interlock into a lightproof unit.

Figure 9:
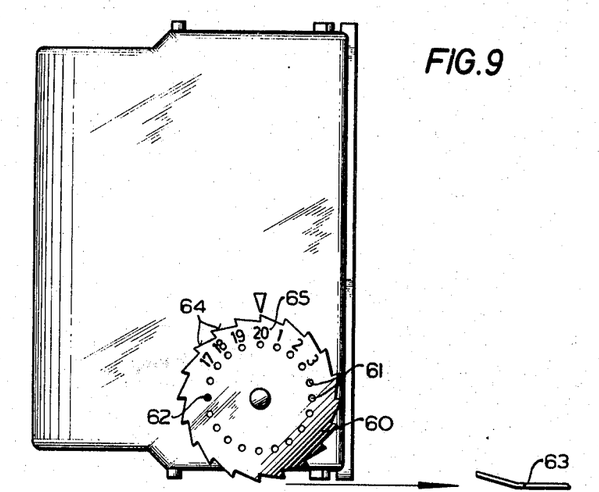
FIG. 9 shows a top view of a part of the magazine on which a counting dial is arranged which is actuated by a plate spring.
Figures 10, 11:
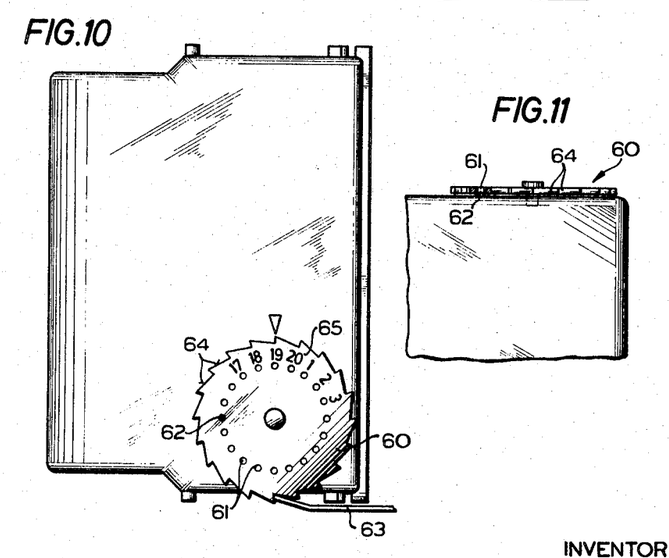
FIG. 10 shows the counting dial shown in FIG. 9 meshed with the flat spring.
FIG. 11 illustrates a side view of the counting dial.

As can be seen from FIGS. 9, 10 and 11, a counting dial 60 is connected to the stationary magazine part 1. The counting dial has the customary perforation series 61, which can lock into projection 62 of magazine chamber 1. With the sled-like device 35, a plate spring 63 is connected which locks this device into teeth 64 of the counting dial 60 when it returns from its position in the area of the rope drum 43 to the initial position and causes the counting dial 60 to advance by one tooth. By means of numbers 65 on the counting dial, the number of completed exposures can thus be controlled as usual.

Before the construction of the coupling device 50 will be described in detail, its function will first be explained. As stated above, the coupling device has been designed as a connecting link between the sled-like device 35 and the movable magazine chamber 5. This sled-like device 35 is moved along the rails 37, 38. In its movement it takes along the magazine chamber 5 up to its final position, in which it is kept by the locking device 46. Thus, unexposed film of the film-supply spool 2 is tensioned in the area of the optical path of rays, so that a picture can be taken. It is a task of the coupling device 50 to lock the film take-up spool 6 against any rotation during this process, so that it will be able to pull the film from the film-supply spool 2. After completion of the exposure process, the exposed part of the film strip is supposed to be spooled up on the film take-up spool. This process must take place during the return of the sled-like device 35 to the initial position. Therefore, locking of the film take-up spool, which takes place initially, must be released and rotation of the film take-up spool must be made possible during the return of the sled-like device, so that the exposed film strip is completely rolled up on the take-up spool, when the magazine chamber 5 is again interlocked with magazine chamber 1. If an additional picture is to be taken, then the described procedure is to be repeated, i.e., the sled-like device is moved once again by the camera and an unexposed film strip, adjacent to the exposed film strip, is pulled from the film-supply spool 2.

Figure 13:
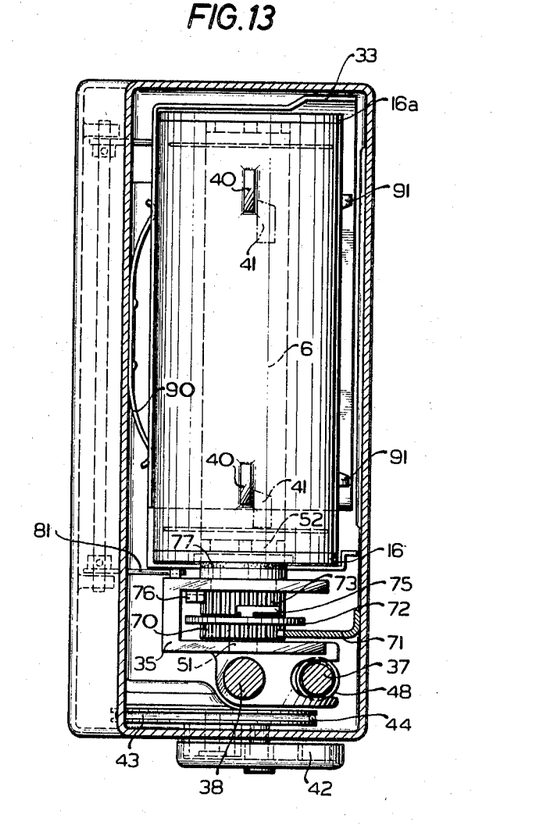
FIG. 13 shows a longitudinal view of the camera shown in FIG. 12.

FIGS. 12 and 13 show that the coupling device 50 is arranged on a shaft 51, which is aligned with the longitudinal axis of the spool of the film take-up spool 6. At the end of the shaft facing the film take-up spool 6, there is a gear link 52 which, to connect with the film take-up spool 6, is designed in such a manner to cooperate with gear and the projection 17 present in the interior of spool 6. This gear link 52 has been designed as a toothed disc in the present construction, whereby the teeth 53 are arranged around the circumference of this gear. To safeguard the toothed disc and thus because of the gearing of this toothed disc with the spool 6, also spool 6 against rotation of the shaft relative to the sled-like device 35, a locking device 54 has been provided on the sled-like device 35. This locking device has been designed as a two-armed lever, which is pivoted in a piece 55. One lever arm 56 has been designed hook-shaped for a suitable gearing with the toothed disc 52. The other lever arm 57 serves as a control lever for setting the position of lever 54. A collector rail 58, arranged parallel to the sliding rails 37, 38 in the area between the two end positions of the sled-like device 35 within the camera housing 20, has such a height that the lever arm 57 of the locking device 54, as soon as it comes in contact with one or the other side edges of the collector rail during the movement of the sled-like device 35, is swiveled around its pivot 55 in such a manner that the lever arm 56 either gears with the gear series of the toothed disc 52 and is kept in this position, or is released from the gear lock and is held in a non-gearing position. The length of the collector rail 58 is chosen in such a manner, that the lever arm 57 does not touch the collector rail 58 while it is in either of the end positions of the sled-type device. To prevent an arbitrary rotation of lever 54, the latter is subjected to spring force, which is activated by a tension spring 59, which on one side is fastened to lever 54 and on the other to sled-like device 35. The position of lever 54 has been so chosen that, when the sled-like device moves away from the magazine chamber 1, in other words when the cocking lever is wound up, the lever arm 56 is geared with the gear series 53 of the toothed disc 52, so that during movement of the magazine chamber 5, the spool 6 is safeguarded against rotation and thus can exercise pull on the film strip in spool 2, so that the film strip is unrolled from spool 2. The release of the lever from toothed disc 52 does not take place until the return of the sled-like device 35, so that the spool 6 turns during this phenomenon of movement. To rotate spool 6, a gear wheel 70 has been placed on the shaft 51, which is in the area of the geared rail 71, which is arranged parallel to the sliding rails 37, 38 at the camera housing along the path of the sled-like device. If the sled-like device moves in one direction or the other, then the gear wheel 70 rotates on shaft 51. A disc 72 is firmly connected to the gear wheel; the disc is placed coaxially on shaft 51. Between this disc 72 and toothed disc 52, in addition a geared ratchet wheel 73 is arranged on shaft 51. The ends of flat springs 75 and 76 mesh with the teeth 74 of this ratchet wheel 73. One end of flat spring 75 is firmly attached to disc 72. The other free end of flat spring 75 is geared with gear series 74 of the ratchet wheel 73 in such a manner that when rotating disc 72 counterclockwise, toothed disc 73 with the teeth 74 follow along and thus the film is rolled up on spool 6. One end of flat spring 76 is firmly attached to one end of the sled-like device. Its free end likewise meshes with the gear rim of the ratchet wheel 73 and thus represents a reverse lock, so that the toothed disc 73, and thus the take-up spool, can turn only in the rolling-up direction.

If the sled-like device 35 moves away from the magazine chamber 1 during the shutter cocking process, then gear wheel 70 unwinds from the geared rail 71. In this process, disc 72 turns clockwise with gear wheel 70 and the free end of the flat spring 75 scrapes over the teeth 74 of the ratchet wheel 73 without interference. This disc 72 turns relative to the ratchet wheel 73, since the clockwise movement of the ratchet wheel is stopped by the meshing of the flat spring 76 with the gear series 74.

When the sled-like device is returned to its initial position, the gear wheel 70 again unwinds from the geared rail 71 and turns clockwise in this process. Disc 72 follows this movement and follows along in the counterclockwise movement through the flat spring 75 geared with the gear series 74 of the ratchet wheel 73.

The flat spring 76 permits one rotation of the ratchet wheel for this phenomenon of movement.

Since during the return of the sled-like device 35 in the direction of the magazine chamber 1, spool 6 is supposed to turn, the rotation of gear wheel 70 and the rotation of the ratchet wheel 73 jointly with the gear wheel must be conveyed to the gear link 52. This is accomplished by means of a friction disc 77 fastened to the shaft between ratchet wheel 73 and this gear link 52, which on the one hand is rotated by ratchet wheel 73 and on the other hand transfers this rotation to the gear link 52.

Thus, as a result of the described construction of the coupling device, the spool 6, on the one hand, does not rotate in its movement with the sled-like device 35 during the tensioning process, but, on the other hand, during the return movement of the sled-like device to its initial position, it rotates and in so doing rolls up the exposed film strip.

An automatic unrolling of the unexposed film strip from the film-supply spool 2 is counteracted by the flat spring 11 provided for in magazine chamber 1, which attaches itself to the film spool and stops its rotation.

To guarantee a plane position of the film ready for exposure within the camera housing, a film pressure frame 30 is provided, which frames the picture section 31. This pressure frame 30 is so arranged in the camera housing that it will be completely outside the path of the sled-like device 35 and the magazine chamber 5 after the exposure procedure.

Figure 21:
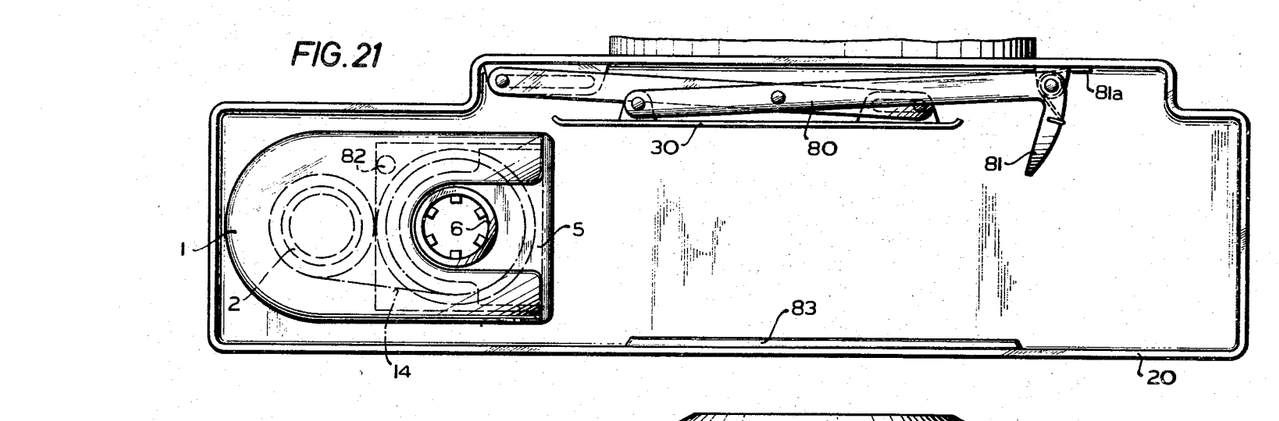
FIG. 21 shows in top view, a partial section of a camera which has been loaded with the invented film magazine and in which the film pressure framework is in rest position.
Figure 22:
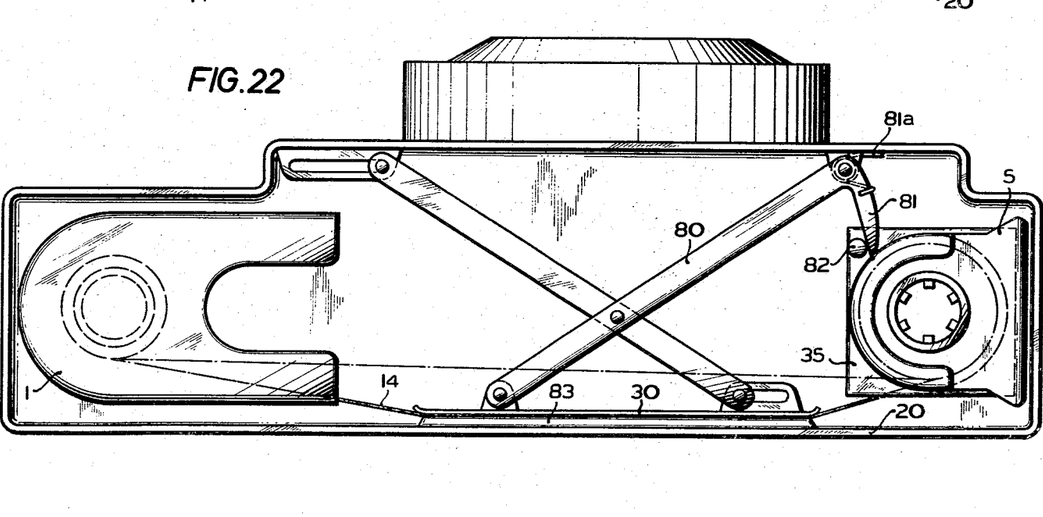
FIG. 22 shows a top view of the camera shown in FIG. 21, in picture taking position of the film magazine and of the film held flat by the film traps.

After the shutter cocking lever 42 has been activated and the film track is located within the area of the optical path of rays, the pressure frame 30 will position the film strip flat against the camera back. In the example shown in FIGS. 21 and 22, the pressure frame 30 is connected to a scissors drive 80 which is designed in the customary manner. This scissors drive has a one-armed lever 81 jutting into the path of the sled-like device fastened at the end in the camera housing, in the area of the end position of magazine chamber 5. One end of the one-armed lever is firmly attached to the scissors drive 80. A pin 82, arranged at the sled-like device 35, meshes with the free end of lever arm 81 directly before reaching the end position of the sliding carriage and causes a deflection of lever 81, and thus, on extension of the scissors drive 80 in such a manner, that the pressure frame 30 presses down on the film strip and presses it against a pressure plate 83 at the back of the camera housing. By means of the shown torsion spring 81a, pressure frame 30 will be moved back from the path of the sled-like device into its initial position as soon as the return movement of the sled-like device starts.

As already previously described, the two magazine chambers 1 and 5 are interlocked lightproof after each exposure as soon as the sled-like device 35 is again in its initial position, and they can be removed from the camera after opening lock part 23, without the danger of undesired exposures of the film strip and without the use of any light screening shutter. Through the described construction of the film magazine of the present invention, the exposed film strip on film take-up spool 6 furthermore can be developed at any time without loss of unexposed film material. Furthermore, it is pointed out that the magazine of present invention can also be used for a so-called two-film camera, if a symmetrical arrangement of both these magazines is chosen.

According to the design of a camera which has not yet been shown, a camera can be loaded with the magazine of present invention and the magazine chamber having the film take-up spool can be inserted in the picture-taking position after closing of the camera and can remain there during the entire exposure process. In this case, the rejoining of the two magazine chambers into a lightproof unit will take place only after exposure of the entire film material.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

What is claimed is:

1. A film magazine, consisting of two magazine parts, the first of which serves to hold a film magazine reel in place and the second, a film take-up spool characterized in that the magazine parts have been provided as containers open on one side which are adapted to be joined together into an all around closed light-tight unit, and a separating magazine comprising both spools, and wherein when the magazine parts are separated the film is unwound from the film magazine reel, and the film take-up spool is blocked during this time, and wherein when joining the magazine parts, that portion of the film that had been unwound from the film magazine reel is wound onto the take-up spool, wherein the film supply reel and the film take-up spool are arranged parallel to each other at the same height in the magazine, the distance of the longitudinal center axis of the spools in the containers being approximately equal to the sum of the two radii of the spool and of the total length of the film turns found on at least one of the spools, the walls of the magazine parts overlapping at least in part when they are joined: in the area of the overlapping walls, a locking device is provided to prevent self-acting shifting of the two magazine parts relative to one another; the locking device is formed by at least one notch to be placed in the interior surface of the wall of one magazine chamber, which will come to lie towards the outside, said notch locking with the projection to be placed on the outside surface of the wall of the other magazine chamber which will come to lie toward the inside; at least one notch is provided as a groove running along a side area of the wall; the film-supply spool and the film take-up spool are arranged to rotate freely in the magazine chambers; one end of the spool of the film take-up spool protrudes through the part of the wall arranged as a base plate of the magazine chamber holding this spool in place: at least the spool of the film take-up spool is provided as a hollow spool; characterized in that spool of the film take-up spool on its interior wall, at least near one of its ends, has a plurality of tooth-like protuberances extending in the direction of its longiitudinal axis and arranged around its circumference; the base plate of the magazine chamber holding the film-supply spool in place, has a recess running parallel starting from its free edge in intervals from the side edges of the magazine chamber whose width approximately corresponds to the diameter of the spool of the film take-up spool; the base plates of the two magazine chambers overlapping in the area of the recess when they are joined; the base plates and the cover plates opposite to them of the magazine chambers having at least one sliding bar each running parallel to one another and to the free edges of the magazine chambers; characterized in that a brake device is provided at least in one magazine chamber which inhibits automatic unwinding of the film from the spool; the brake device providing a flat spring with two free ends which are arranged on the interior wall of the magazine chamber holding the film-supply tool in such a manner that one of its free ends lies against the film-supply spool and the other free end flexibly abuts the film take-up spool.

2. A film magazine having two magazine parts, one of which serves to hold a film magazine reel, and the other serving to hold a film take-up spool, the magazine parts providing containers that are open on one side and which are adapted to be joined together into an all around closed light-tight unit; a separating magazine comprising both of said reel and spool, a brake mechanism for controlling the film magazine reel to prevent unwinding of the film from the magazine reel, and said film take-up spool being provided with means including a coupler link and toothed disc for unwinding that portion of the film that is unwound from the film magazine reel during the separation of the magazine parts onto the film take-up spool while joining the magazine parts together.

3. A camera comprising a housing into which one side of lateral to an optical path of rays is inserted a film magazine that comprises a film supply reel and a film take-up spool parallel thereto, and to be inserted transversely to the spool axes, said film magazine consisting of two chambers that are open on one side, means for locking the chambers with their open sides so that said sides can be arranged in a lightproof unit, one of said magazine chambers comprising the film supply reel and the other comprising the film take-up spool, the magazine chamber comprising the film supply reel being provided outside the camera relative to the housing of the camera and the magazine chamber comprising the film take-up spool being provided inside the camera relative to the housing of the camera, the film supply reel being detachably supported, the side walls of the magazine chamber comprising the film take-up spool abutting the side walls of the magazine chamber comprising the supply reel, guides being provided for displacement of the magazine chamber comprising the film take-up spool through the optical path of rays, a locking mechanism coacting with the film take-up spool when being displaced to prevent unwinding of the film wound up to the film take-up spool, a wind-up drive mechanism coacting with the film take-up spool, rotating the film take-up spool when displacing it to wind up the film, and a brake means coacting with the film supply reel for preventing unwinding of the film supply reel.

References Cited

UNITED STATES PATENTS

| | | | |
|---|---|---|---|
| 461,308 | 10/1891 | Blair et al. | 95—34 |
| 1,823,462 | 9/1931 | Morsbach | 95—34 |
| 1,947,482 | 2/1934 | Mihalyi | 95—31 |
| 2,184,003 | 12/1939 | Parker et al. | 352—78 |
| 2,568,339 | 9/1951 | Jacobson | 352—78 |
| 3,095,779 | 7/1963 | Foster | 352—78 |

FOREIGN PATENTS 156,900   9/1939   Germany.

NORTON ANSHER, Primary Examiner.

JOSEPH F. PETERS, JR., Assistant Examiner.

U.S. Cl. X.R.

242—71.2